May 10, 1932.　　　N. LOMBARD　　　1,858,051

HIGH SPEED GEAR SHIFT

Filed April 13, 1931　　　3 Sheets-Sheet 1

Inventor
Nathaniel Lombard
By Attorneys
Southgate Roy & Hawley

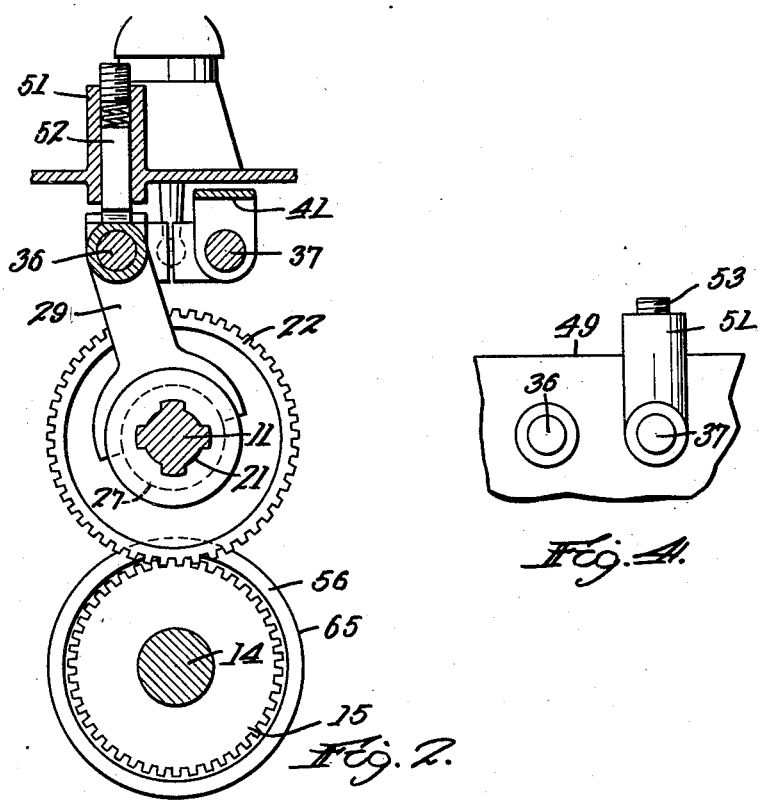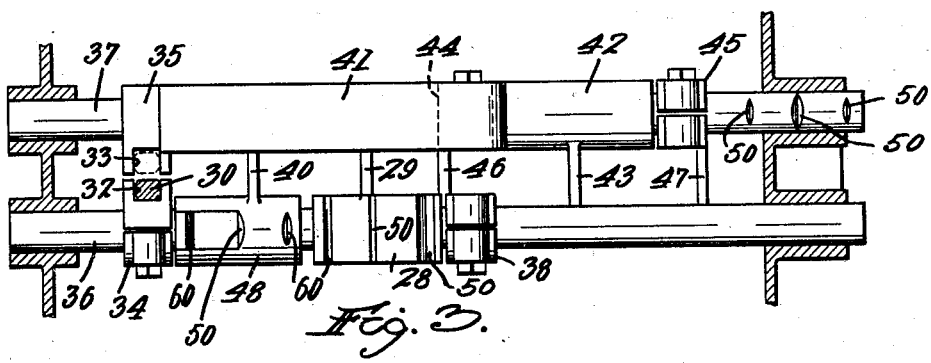

Inventor
Nathaniel Lombard
By Attorneys
Southgate Ray + Hawley

Patented May 10, 1932

1,858,051

UNITED STATES PATENT OFFICE

NATHANIEL LOMBARD, OF WORCESTER, MASSACHUSETTS

HIGH SPEED GEAR SHIFT

Application filed April 13, 1931. Serial No. 529,626.

This invention relates to noiseless change speed gearing capable of general use but particularly adapted for use on automobiles. Heretofore many devices have been invented for the purpose of securing a noiseless shifting of gears, but successful ones have involved complicated and bulky features which are difficult to assemble and require a considerable increase in the size of the gear casing.

The principal objects of this invention are first, to provide a construction which will permit a noiseless and easy shifting of the gears of a change-speed gear transmission; second, to provide a construction for this purpose in which all temporary holding means for the gears are located outside the gearing and the driven shaft is free from them; third, to provide a construction for this purpose which, when the engine is in direct connection to the main driven shaft, permits the counter-shaft, holding the gears for lower speeds, to be disconnected and shut down, thus preventing unnecessary churning and destruction of the oil in the gear case and saving the power at present required therefor in all other forms of construction; and fourth, to provide these features in a simple, inexpensive and convenient arrangement of parts easy to assemble.

Other objects and advantages of the invention will appear hereinafter.

Reference is to be had to the accompanying drawings, in which

Fig. 2 is a sectional view on the line 2—2 of Fig. 1;

Fig. 3 is a sectional view on the line 3—3 of Fig. 1, showing the shifting rods in plan;

Fig. 4 is an end view of the outside of the top part of the casing;

Figure 1:
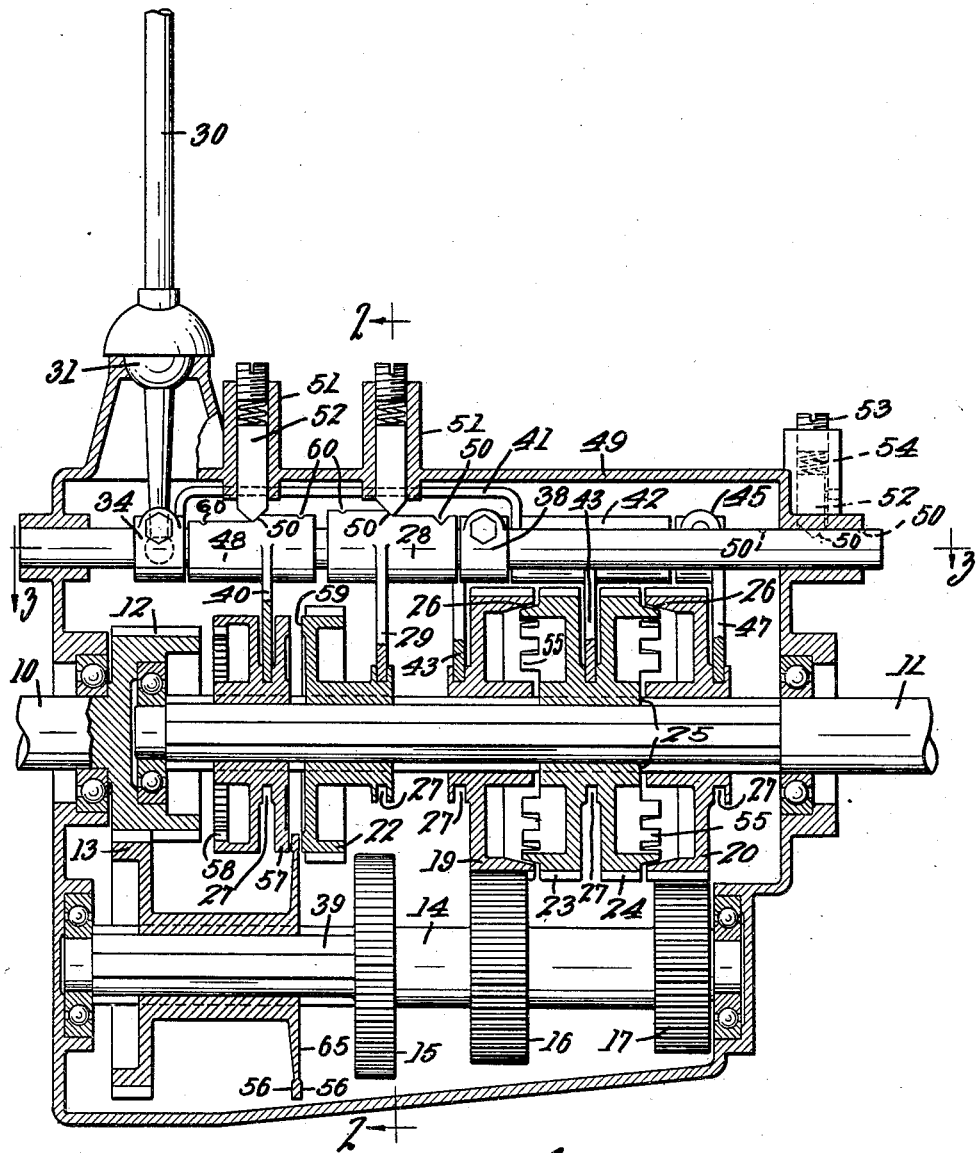
Fig. 1 is a sectional view of a gear casing showing a preferred embodiment of this invention in partial elevation and in neutral position.
Figure 5:
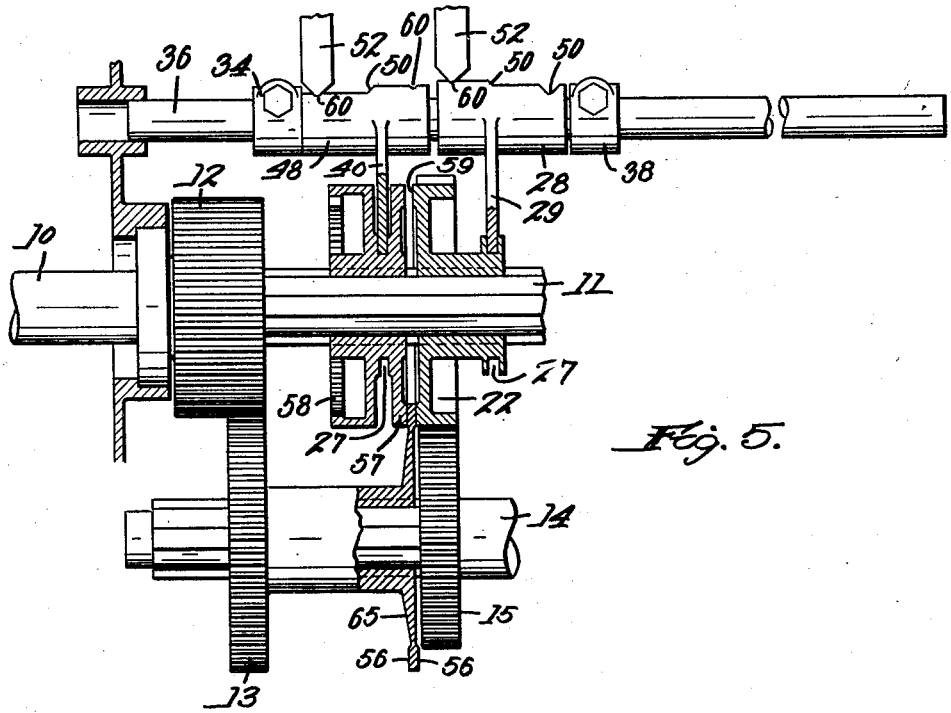
Fig. 5 is a view similar to Fig. 1 showing the first set of gears shifted from neutral position, fully connected in second speed.
Figure 6:
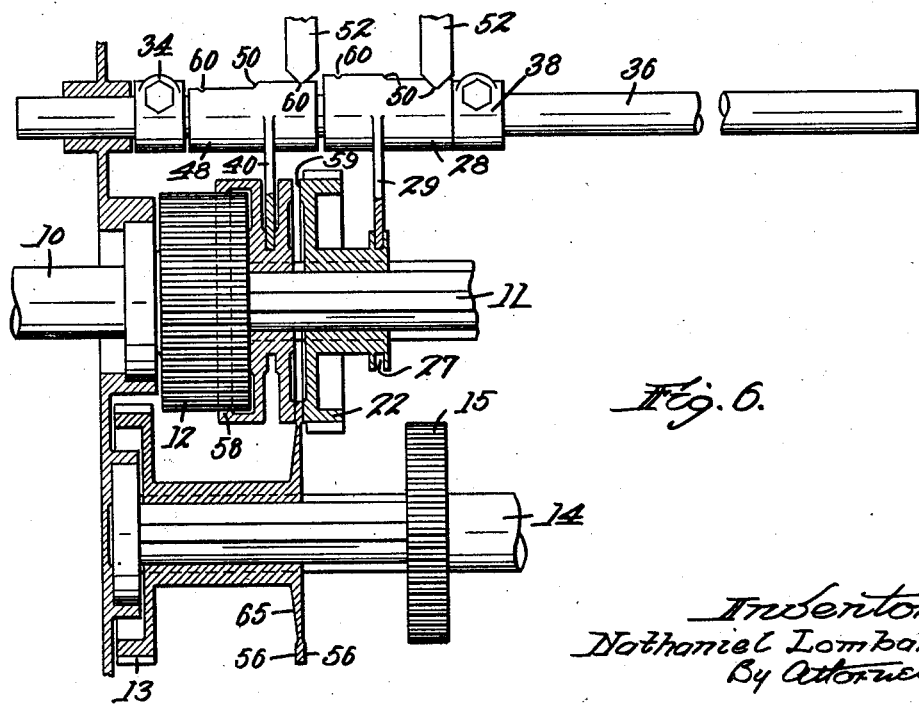
Fig. 6 is a side view of the direction connection clutch, partly in section showing it fully connected in high speed.

The invention is shown as applied to a gear transmission. It involves the motor shaft 10 for operating the drive shaft 11. The motor shaft has a gear 12 for driving a gear 13 which drives a countershaft 14, which has in this case three gears 15, 16 and 17 fixed to it. The gear 15 meshes with a gear 22, the gear 16 with a gear 19 and the gear 17 through a third or reversing gear with a gear 20 which, of course, will reverse the rotation of the shaft 11. The gears 19 and 20 are rotatably mounted on the shaft 11 which throughout this series of gears is provided with longitudinal slots 21.

Slidably keyed to this slotted part of the shaft 11 are gears 22, 23 and 24, the latter two cooperating with the gears 19 and 20 respectively in pairs. They are fixed to this shaft 11 by having internal projections 25 extending into the slots 21 and all these five gears are slidable on this shaft. Each pair of gears as 19 and 23 and 20 and 24 are provided with cooperating conical surfaces 26, which are normally out of contact with each other as shown in Fig. 1. On these gears are circumferentially grooved collars 27 which can be operated by the several yokes as will appear.

The usual shifting lever 30 is employed, which has a universal support 31 to allow it to turn in two directions at right angles to each other. The lower end of it is adapted to engage in either one of two slots 32 and 33 in a split collar 34 and a slide 35 on the two rods 36 and 37 which are arranged parallel with each other as usual and are shiftable endwise. The front one of these rods 36 is provided with another split collar 38 fixed to it. On two shifting slides 28 and 48 on the rod 36 are also yokes 40 and 29.

The rear slide 35 is provided with a bridge 41 which connects it with a slide 42 on the rod 37. This slide 42 is provided with a yoke 43. On the rod 37 there are two split collars 44 and 45 fixed to it and provided with two yokes 46 and 47. These several yokes 29, 40, 43, 46 and 47 are all connected with the several collars 27 and therefore are adapted to shift the several gears in certain relationships. The split collars are all spaced from the slides 48, 28 and 42 when the parts are in neutral position as shown in Fig. 1.

One of each pair of gears, 23 and 24, is provided in its conical surface 26 with notches 55 around the circumference. These notches are provided so that when the two conical surfaces of the gears of each pair come together any oil getting in between them will be scraped off by the square edges of these notches and prevent it from causing any restriction to the effectiveness of the cone clutches.

The rod 37 is provided in this case with three V-shaped notches 50. In cooperation therewith is a cylinder 51 on a casing 49 having a spring-pressed plunger 52 provided with a V-shaped end to enter these notches. A screw 53 is arranged at the top of the cylinder to hold the spring 54 and provide access to the interior. The screw also is capable of adjusting the compression of the spring. The center one of the notches 50 is deeper than the others to afford more resistance when shifting from neutral into gear.

The features above described for shifting into reverse or low gear and comprising the gears 19, 20, 23, 24 and the rod 37 are shown and described as identical with the corresponding parts shown in my pending application Serial No. 524,521, filed March 23, 1931. They are included in this case mainly for the purpose of comprising a complete and practical gear change construction.

This invention relates to the means for shifting into intermediate speed and particularly into high speed with the shafts 10 and 11 directly connected. For this purpose I provide on the shaft 14 longitudinal key slots 39, and slidably mounted on this is the gear 13 adapted to mesh with the long surfaced gear 12 carried by the shaft 10. The gear 13 is in the form of a spool having a circular disc 65 having a pair of opposite flat friction surfaces 56 on opposite sides at its circumference.

The gear 22 which is slidable on the shaft 11 and also keyed to it, is operated by the yoke 29 on the slide 28. The slide 48 by its yoke 40 operates in the collar 27 between two members integrally connected together, one of them, 57, having a flat friction surface for engaging one of the surfaces 56, and the other one having an internal gear 58. The gear 22 also has a flat friction surface 59 operating against the other one of the surfaces 56. The external gear 12, which is elongated so that the gear 13 can slide in it and still be operated by it, is adapted to cooperate also with the internal gear 58.

The slide 48 is provided with a deep notch 50 and two shallow notches 60. A plunger 52 in a cylinder 51 on the casing 49 operates the same as the one previously mentioned which operates on the rod 37. The slide 28 has two deep notches 50 and a shallow notch 60. The notches 50 are reversed on the two slides 28 and 48. There is a third cylinder 51 on the casing 49, its plunger cooperating with the slide 48.

In the operation of the device, starting from neutral position as shown in Fig. 1, if it is intended to start in reverse or low forward speed the starting lever 30 is shifted so that the lower end will come into the notch 33 and then it is moved from central position either to the front or back according to the desired direction of motion. In either case the gear 23 or 24, as the case may be, will be caused to move over toward its companion gear and the conical surfaces 26 are brought into contact.

It will be understood of course that the gears 23 and 24 are constantly running whenever the car is moving and therefore the gear 19 or 20 will be started up frictionally. It will soon get to the speed of the gear 23 or 24 and although the teeth of the two gears may not be in registration they will rotate at practically the same speed. The motion of the rod 37 brings its plunger 52 part way out of its deep notch 50 and creates a resistance which is released as soon as the plunger is entirely out of the notch. This relieves the pressure on the conical surfaces 26 allowing a little slip between the two gears if they are not exactly synchronized which will bring the teeth of the two gears of the pair into registration. Then the further shifting of the rod will slide the gears together, as will be seen readily. Thus the gears 16 and 23, or 17 and 24, through the back gear, will be in mesh at their edges and as the rod is shifted further along they will come into sideways registration with each other and the shaft 11 will be rotated in the direction desired when the clutch is engaged. It will be understood readily that if the gears 16 and 23 are thus brought into mesh the shaft 11 will be rotated at low speed forward.

In shifting from low speed to the intermediate speed, it will be understood that the gear 23 is first shifted to neutral, and that the gear 22 is in the position shown in Fig. 1 and is being rotated by the shaft 11. Therefore, if the rod 36 is moved to the right through the collar 34, the slide 48 will first be picked up. This moves the disc 57 into contact with one surface 56 and immediately moves the other surface 56 against the surface 59. Thus the gear 22 is driven frictionally. Also pressure is applied to the gear 22 and to the plunger 52 through the slide 28. Further movement of the slide 48 will move the gear 22 into contact with the side of the gear 15 and also force the plunger 52 out of its notch 50. As they are both rotating at similar speeds, but not at the same speed, the gears 22 and 15 will be brought into gear very readily. This, of course, means that the parts 48, 28 and 22 are shifted over further to the right with the gears 22 and 15 in mesh. This brings the plunger over into the left hand shallow notch 60 in the slide 28. The other plunger is also in the left hand shallow notch 60 of the slide 48.

Now when it is desired to shift into high speed and connect directly the shaft 10 and 11, the rod 36 and therefore the collars 34 and 38 are moved to the left. The slide 28 will be picked up by the collar 38. The gear 22 will move out of mesh with the gear 15 and while that action is taking place the plunger is dislodged from the left hand notch 60 and enters the center deep notch 50 of the slide 28. The other slide 48 has now also been moved through 22, 65, 57 and 40 to a corresponding position. As the rod 36 moves further to the left, the slide 28 will move with it. This structure comprising the disc 57 and the gear 58 will be rotating at a relatively high speed by the momentum of the car and the disc 65 will be moving to the left through the action of the gear 22. Finally the gear 58 will pass to the left into mesh with the gear 12 after which the gear 13 moves out of mesh with that gear. When the intermeshing of the gears 58 and 12 is complete, however, all the driving force will be transmitted through the gear 12 to the gear 58 and the shaft 11 which constitutes a direct connection and the driven shaft will be rotated at its maximum speed. During the running at high speed all the gears 13, 15, 16, 17, 19 and 20 are at rest and are not churning up oil in the gear box, thus breaking down the oil and consuming power. In shifting out of high speed, the gear 13 is first started up by the friction surfaces 57 and 56 and brought up nearly to synchronism. The friction surfaces are so designed as to do this but not to bring them exactly to the same speed, so that the teeth will slip together. This prevents the two gears running exactly together, one or the other is gaining or losing on the other. They will soon come to a point where they can be shifted into mesh. The same is true of the gears 15 and 22.

The relative arrangement of the notches 50 and 60 is such that there will be a resistance to the pushing one of the plungers 52 out of the notch 50 to move into the small notch 60 at the top of the slide 28 when moving the rod 36 to the right. The reverse is true when moving it to the left, which latter is necessary in order to connect the shaft 11 in high speed.

The collars 34 and 38 are spaced from the slides 28 and 48 as stated, and the latter are spaced apart so that this action will have room to take place.

It will be understood therefore that by this invention the gears of the entire transmission, involving the reverse and two or more speed changes in a forward direction, can be accomplished without the clashing of gears in a very quick manner and also without the danger of knocking off the teeth or the corners of the teeth when the gear changes are made. The parts are durable and unlikely to get out of order and very little is added to the ordinary gear transmission so that the whole transmission will occupy little or any more space than it does without these additions. This reduces the space very materially, at least over the devices now on the market for reducing the noise of gear changes, and there are no conditions under which the operator has not full control of the drive. The clutch for high speed is reduced to the simplest form.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. In a transmission gear set, the combination with a motor shaft, a driven shaft and a counter-shaft, of a gear on the motor shaft and a disc and gear slidably keyed to the counter-shaft, said gears meshing with each other by which the counter-shaft is driven, another gear on the counter-shaft, a pair of gears on the driven shaft, one normally meshing with the last named gear on the counter-shaft but freely rotatable on the driven shaft, the other having the same size and number of teeth and located adjacent to the said gear on the driven shaft and slidably keyed thereto, said pair of gears having frictional surfaces on their adjacent sides adapted to come into contact with each other to drive the loose gear by the tight gear by friction prior to the movement of the keyed gear into mesh with the gear on the counter-shaft, and a pair of intermeshing gears, one fixed on the counter-shaft and the other slidingly keyed to the driven shaft, the latter having a friction surface adapted to engage said disc to be driven thereby to bring it up to speed before shifting.

2. In a transmission gear set, the combination with a motor shaft, a driven shaft and a counter-shaft, of a gear on the motor shaft and a spool slidably keyed to the counter-shaft, said spool having a gear and a disc thereon, said gears meshing with each other by which the counter-shaft is driven, another gear on the counter-shaft, a pair of gears on the driven shaft, one normally meshing with the last named gear on the counter-shaft but freely rotatable on the driven shaft, the other located adjacent to the said gear on the driven shaft and slidably keyed thereto, said pair of gears having frictional surfaces on their adjacent sides adapted to come into contact with each other to drive the loose gear by the keyed gear by friction prior to the movement of the keyed gear into mesh with the gear on the counter-shaft, a pair of intermeshing gears, one fixed on the counter-shaft and the other slidingly keyed to the driven shaft, the latter having a friction surface adapted to engage said disc, a disc slidingly keyed to the driven shaft, and means for moving the last named disc into contact with the first named disc, then moving both discs to bring the first named gear and finally moving the last named gear into mesh with the corresponding gear on the counter-shaft.

3. In a transmission gear set, the combination with a motor shaft, a driven shaft and a counter-shaft, of gears for driving the counter-shaft from the motor shaft, a gear fixed on the counter-shaft, a pair of gears, one slidably keyed and the other loose on the driven shaft having the same number of teeth, either one adapted to mesh with the gear on the counter-shaft and having frictional driving surfaces between them, whereby when the loose gear is in mesh with the counter-shaft gear and the keyed gear is moved toward it, the first effect will be to pick up the loose gear and rotate it by friction from the tight gear, a slidable rod adapted to be moved by the operator, a slide on the rod having a limited motion with respect thereto and having V-shaped notches, a spring-pressed plunger having a V-shaped end adapted to enter one of said notches, two collars fixed to the rod, both normally at a short distance from the ends of said slide, yokes connected with said slide and collar to operate the gears, whereby when the operating lever is moved from neutral position the spring-pressed plunger will be gradually forced out of its notch when the gears come into contact with their frictional surfaces for rotating the counter-shaft.

4. In a transmission gear set, the combination with a driving shaft, a driven shaft, and a counter-shaft, of a gear slidingly keyed to the counter-shaft and having a friction disc, a gear on the driving shaft meshing with said gear, and two separate gears both slidingly keyed on the driven shaft, one adapted to mesh with the gear on the driving shaft, a gear fixed to the counter-shaft and adapted to mesh with the other slidable gear on the driven shaft, said gears on the driven shaft both having friction surfaces adapted to engage the friction surfaces on said disc.

5. In a transmission gear set, the combination with a driving shaft, a driven shaft, and a counter-shaft, of a spool slidingly keyed to the counter-shaft and having a gear at one end and a double surfaced friction disc at the other, a long surfaced gear on the driving shaft meshing with said gear, and two separate gears, both slidingly keyed on the driven shaft, one being an internal gear adapted to mesh with the gear on the driving shaft, a gear fixed to the counter-shaft and adapted to mesh with the other slidable gear on the driven shaft, said gears on the driven shaft both having friction surfaces adapted to engage the friction surfaces on said disc.

6. In a transmission gear set, the combination with a driving shaft, a driven shaft, and a counter-shaft, of a spool slidingly keyed to the counter-shaft and having a gear at one end and a double surfaced friction disc at the other, a long surfaced gear on the driving shaft meshing with said gear, two separate gears, both slidingly keyed on the driven shaft, one being an internal gear adapted to mesh with the gear on the driving shaft, a gear fixed to the counter-shaft and adapted to mesh with the other slidable gear on the driven shaft, said gears on the driven shaft both having friction surfaces adapted to engage the friction surfaces on said disc, and means for moving the gears on the driven shaft to bring their respective friction surfaces into contact with the disc and move the spool along the counter-shaft, thereby moving the first named gear into or out of mesh with the gear on the driving shaft.

7. In a transmission gear set, the combination with a driving shaft, a driven shaft and a counter-shaft having a gear fixed thereto, of a gear rotatable with the driving shaft, a gear slidably keyed to the driven shaft and meshing with the first-named gear and having a disc provided with friction surfaces on opposite sides, a gear slidably keyed to the driven shaft adapted also, in one position, to mesh with the second-named gear and also having a friction surface adapted, in certain positions, to engage one of the friction surfaces on the spool, and another gear slidably keyed to the driven shaft adapted to mesh with the gear fixed on the counter-shaft in one of its positions and in another position adapted to engage the opposite friction surface on the disc, for the purpose described.

8. In a transmission gear set, the combination with a driving shaft, a driven shaft and a counter-shaft having a gear fixed thereto, of a gear rotatable with the driving shaft, a spool slidably keyed to the driven shaft and having a gear meshing with the first-named gear and also having a disc provided with friction surfaces on opposite sides, a gear slidably keyed to the driven shaft adapted also to mesh with the second-named gear and also having a friction surface adapted to engage one of the friction surfaces on the spool, another gear slidably keyed to the driven shaft adapted to mesh with the gear fixed on the counter-shaft and adapted to engage the opposite friction surface on the spool, means for moving the last named gear into mesh with the gear on the counter-shaft and for moving it in the opposite direction to bring its friction surface into engagement with the friction surface on the spool and for moving that spool along the counter-shaft until the other friction surface on the spool engages the friction surface on the first-named gear on the driven shaft, whereby the rotation of the driven shaft will be transmitted to the counter-shaft through the friction surfaces, when the first two gears are moved out of mesh, and means for moving the first gear on the driven shaft into mesh with the gear on the driving shaft, whereby the driven shaft will be positively driven by direct connection with the driving shaft.

9. In a transmission gear set, the combination with a driving shaft, a driven shaft and a counter-shaft having a gear fixed thereon, of means for driving the counter-shaft from the motor shaft positively, said means being disengageable, a disc having friction surfaces slidably keyed to the counter-shaft, two gears slidably keyed to the driven shaft, one of them adapted to be moved into a position to be driven directly by the driving shaft and the other being adapted to be moved into a position to mesh with the gear fixed on the counter-shaft, both of said gears having friction surfaces adapted to come into contact with the first-named friction surfaces, an operating lever, a rod shiftable by said operating lever in either direction and having two collars fixed thereon, a pair of slides freely movable on the rod between the collars, each having a yoke for operating one of the gears on the driven shaft, said slides having notches, and a pair of spring-pressed plungers engaging the notches in their respective slides, said notches being so arranged that when one slide is moved to move the second gear on the driven shaft into a position to be driven by the counter-shaft, the spring-pressed plunger associated therewith will furnish enough resistance to slow up that gear so that when it engages the side of the gear on the counter-shaft, the two gears will be running at slightly different speeds and will soon come into mesh with each other.

10. In a transmission gear set, the combination with a driving shaft having a gear fixed thereto, a driven shaft and counter-shaft, of means for driving the counter-shaft from the motor shaft gear positively, said means being disengageable, a disc having friction surfaces slidably keyed to the counter-shaft, two gears slidably keyed to the driven shaft, one of them adapted to be moved into a position to be driven directly by the driving shaft and the other being adapted to be moved into a position to be driven directly by the counter-shaft, both of said gears having friction surfaces adapted to come into contact with the first-named friction surfaces, an operating lever, a rod shiftable by said operating lever in either direction and having two collars fixed thereon, a pair of slides freely movable on the rod, each having a yoke for operating one of the gears on the driven shaft, said slides having notches, and a pair of spring-pressed plungers engaging the notches in their respective slides, said notches being so arranged that when one slide is moved to move the first gear on the driven shaft into mesh with the gear on the driving shaft, the spring-pressed plunger associated therewith will furnish enough resistance to slow up that gear so that when it engages the side of the gear on the driving shaft, the two gears will be running at slightly different speeds and will soon come into mesh with each other.

In testimony whereof I have hereunto affixed my signature.

NATHANIEL LOMBARD.